(12) United States Patent
Aureglia et al.

(10) Patent No.: US 7,243,096 B2
(45) Date of Patent: Jul. 10, 2007

(54) METHOD AND SYSTEM IN AN ELECTRONIC DATA TABLE FOR MANAGING ORDER ORIENTED CRITERIA

(75) Inventors: Jean-Jacques Aureglia, Saint Martin du Var (FR); Frederic Bauchot, St Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 447 days.

(21) Appl. No.: 10/835,015

(22) Filed: Apr. 29, 2004

(65) Prior Publication Data

US 2004/0249852 A1 Dec. 9, 2004

(30) Foreign Application Priority Data

Apr. 29, 2003 (EP) ................................. 03368044

(51) Int. Cl.
*G06F 7/00* (2006.01)
(52) U.S. Cl. .......................................... 707/3; 707/103
(58) Field of Classification Search .................... 707/2, 707/3–10, 101–104
See application file for complete search history.

(56) References Cited

U.S. PATENT DOCUMENTS 5,701,499 A 12/1997 Capson et al. ............... 395/764
5,926,822 A 7/1999 Garman ....................... 707/503

(Continued)

OTHER PUBLICATIONS

Cobb, S., "Using Quattro Pro 2", Borland-Osborne/McGraw-Hill, 1990 (title & copyright pages, table of contents).

(Continued)

*Primary Examiner*—Wilson Lee
(74) *Attorney, Agent, or Firm*—Schmeiser, Olsen & Watts; David L. Adour

(57) ABSTRACT

The present invention is related to a method, system and computer program for processing, on a data table, a command comprising one or a plurality of order oriented criterias. The data table is defined as a structured multidimensional range of cells comprising one or a plurality of fields defined as a range of cells along a first dimension; and a plurality of records defined as a range of cells structured according to one or a plurality of fields along a second dimension. The method comprises the steps of receiving a command comprising means for identifying a data table and a specified field in the data table; one or more cell content criterias and one or more order oriented criterias, each order oriented criteria specifying a range of ranks according to a reference record complying with one or plurality of cell content criterias in the data table; processing one or plurality of cell content criterias on the specified one or plurality of fields of the data base and selecting the records complying with the processed one or plurality of cell content criterias; determining, from a given first selected record in the data table, the rank of each selected record along the first dimension and entering the rank in a temporary field defined for each selected record; converting the one or plurality of order oriented criterias in a new cell content criteria to apply on the temporary field; processing the new cell content criteria on the temporary field of the selected records and identifying the records complying with the new cell content criteria; returning the result of the received command, computed from the cells belonging to the field specified in the command, and the records identified among the selected records.

11 Claims, 9 Drawing Sheets

U.S. PATENT DOCUMENTS

| | | | | |
|---|---|---|---|---|
| 6,094,651 | A | * | 7/2000 | Agrawal et al. ............... 707/5 |
| 6,298,342 | B1 | * | 10/2001 | Graefe et al. ................... 707/4 |
| 6,373,504 | B1 | | 4/2002 | Nielsen ...................... 345/739 |
| 2001/0016855 | A1 | | 8/2001 | Hiroshige ................... 707/503 |
| 2002/0059203 | A1 | * | 5/2002 | Witkowski et al. ............ 707/3 |

OTHER PUBLICATIONS

Lebond, G. and Cobb, D., "USING 1-2-3", 1985, Que Corporation, Indianpolis, Indiana (title & copyright pages, table of contents).

"Microsoft Mouse Programer's Reference" and "Microsoft Mouse Programmer's Reference Second Edition", Microsoft Press, 1989 (title & copyright pages, table of contents, Chapters 1 & 2, "Evolution of the Mouse"; "Overview of Mouse Programming").

Petzold, C., Programming Windows, Second Edition, Microsoft Press, 1990 (titile & copyright pages, table of contents).

Quattro Pro, Version 3.0, User's Guide, Borland International Inc., Scotts Valley, CA, 1987, 1991 (title & copyright pages, table of contents).

* cited by examiner

| | A | B | C | D | E | F | G | H |
|---|---|---|---|---|---|---|---|---|
| 1 | | Operator | Temperature | Measure#1 | Measure#2 | Measure#3 | Measure#4 | Measure#5 |
| 2 | | frederic | 20.4 | | 30.20483 | 11.49884 | 12.01978 | 5.63894 |
| 3 | | jean-jacques | 17.6 | | 32.61443 | | 13.63509 | 27.28551 |
| 4 | | jean-jacques | 19.4 | 0.00707 | 30.79493 | 10.77606 | 19.44993 | 90.02454 |
| 5 | | jean-jacques | 21.5 | 0.00408 | | 10.08307 | 10.02878 | 7.98287 |
| 6 | | frederic | 21.8 | 0.00516 | 30.26147 | 10.09312 | 18.82420 | 83.37172 |
| 7 | | jean-jacques | 21.9 | 0.00807 | | 11.09449 | 7.54017 | 6.25734 |
| 8 | | frederic | 20.3 | | 26.98680 | | | 26.50831 |
| 9 | | frederic | 21.4 | 0.00474 | 27.14588 | | 13.13470 | 68.23509 |
| 10 | | frederic | 18.1 | | 30.79335 | 10.86117 | 11.55365 | 22.43987 |
| 11 | | jean-jacques | 21.2 | 0.00724 | 27.98531 | | 5.98692 | 0.78287 |
| 12 | | frederic | 16.9 | 0.00387 | 29.11944 | | | 49.27816 |
| 13 | | jean-jacques | 15.5 | 0.00908 | 32.48730 | 11.83459 | 0.68465 | 74.66463 |
| 14 | | frederic | 15.8 | | 33.13836 | 11.89692 | 2.22671 | 115.38500 |
| 15 | | jean-jacques | 19.7 | 0.00693 | 26.46556 | 11.52829 | 13.26467 | 98.79451 |
| 16 | | frederic | 17.2 | 0.00727 | | 11.38698 | 10.39284 | 19.04436 |
| 17 | | jean-jacques | 22.9 | 0.00524 | 28.17741 | 10.91784 | 13.64659 | 16.94357 |
| 18 | | jean-jacques | 22.9 | 0.00172 | 27.69829 | 10.05318 | 0.42967 | 30.82443 |
| 19 | | jean-jacques | 23.3 | | 25.19455 | 11.80307 | 11.81054 | 110.39262 |
| 20 | | jean-jacques | 19.7 | 0.00873 | | | 19.65721 | 90.32422 |
| 21 | | frederic | 18.4 | 0.00113 | 32.79768 | | 4.61890 | 19.30426 |
| 22 | | frederic | 23.0 | | 30.65445 | | 18.66327 | 85.89285 |
| 23 | | frederic | 15.1 | | | | | 57.85973 |
| 24 | | frederic | 24.8 | | | | | 71.16988 |

| A | A | B | C | D | E | F | G | H | I |
|---|---|---|---|---|---|---|---|---|---|
| 31 | | Measure#3 | #RANK# | Measure#1 | #RANK# | Measure#2 | #RANK# | Measure#3 | #RANK# |
| 32 | | >0 | <TOP+5 | >0 | TOP | >0 | MED | >11.5 | >BOTTOM−4 |
| 33 | | | | | | | | | |

| A | A | B | C | D | E | F | G |
|---|---|---|---|---|---|---|---|
| 26 | | Average value for 5 most recent samples #3 | | | | | 10.70911 |
| 27 | | Value of the most resent sample #1 | | | | | 0.00707 |
| 28 | | Value of sample #5 for median sample #2 | | | | | 74.66463 |
| 29 | | Minimum of samples #4 for 4 less resent samples #3>11.5 | | | | | 0.68465 |
| 30 | | | | | | | |

500

501 — 10.70911
502 — 0.00707
503 — 74.66463
504 — 0.68465

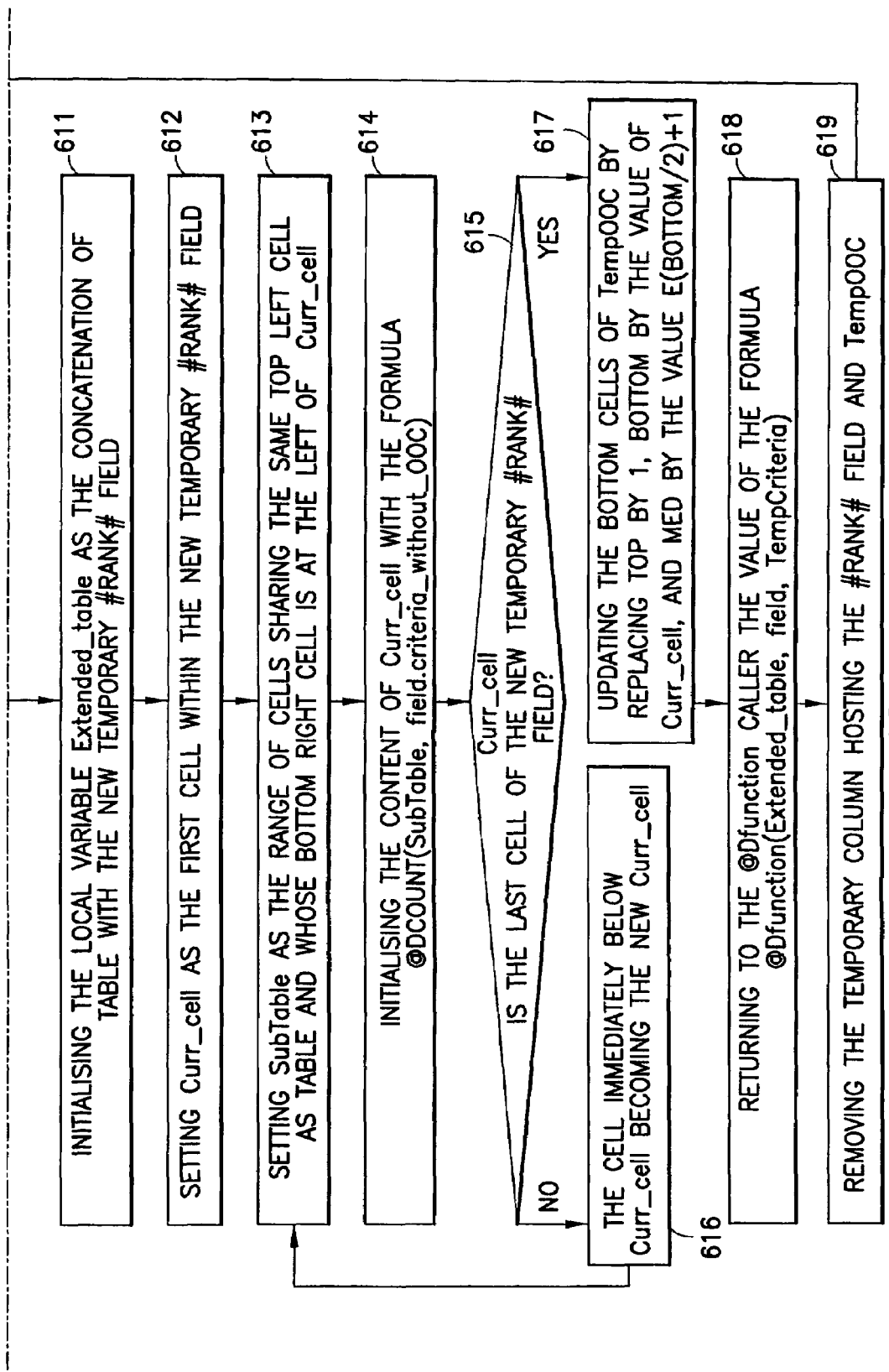

METHOD AND SYSTEM IN AN ELECTRONIC DATA TABLE FOR MANAGING ORDER ORIENTED CRITERIA

TECHNICAL FIELD OF THE INVENTION

The present invention relates to the field of information processing by digital computers, and more particularly to a method and system for managing Order Oriented Criterias in a data table, preferably in a large electronic spreadsheet.

BACKGROUND OF THE INVENTION

Before computers, numerical analysis, particularly financial ones, were usually prepared on an accountant's columnar pad or spreadsheet, with pencil and calculator in hand. By organising data into columns and rows, spreadsheets afford the rapid assimilation of information by a reader. The task of preparing a spreadsheet on paper, however, is not quite so fast. Instead, the process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerised replacement for the traditional financial modelling tools: the accountant's columnar pad, pencil, and calculator. In some regards, spreadsheet programs are to those tools what word processors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, a letter to each column, and another letter to each sheet (or page) of the spreadsheet. To reference a location at column A and row 1 of the second page (i.e., the upper-left hand corner), for example, the user types in "B:A1". In this manner, the spreadsheet defines an addressable storage location or "cell" at each intersection of a row with a column within a given page.

Data entry into an electronic spreadsheet, occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. Such spreadsheet cells can also be defined and named as a range as long as they are arranged as a related set of cells. A typical example of such a named range simply corresponds to a regular table found in an accountant's pad. In this fashion, range names can serve as variables in an equation, thereby allowing precise mathematical relationships to be defined between cells. The structure and operation of a spreadsheet program, including advanced functions such as functions and macros, are documented in the technical, trade, and patent literature. For an overview, see e.g., Cobb, S., *Using Quattro Pro* 2, Borland-OsborneIMcGraw-Mll, 1990; and LeBlond, G. and Cobb, D., *Using* 1-2-3, Que corp., 1985.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what-if" scenarios. After a set of computational relationships has been entered into a worksheet, thanks to imbedded formulas for instance, the spread of information can be recalculated using different sets of assumptions, with the results of each recalculation appearing almost instantaneously. Performing this operation manually, with paper and pencil, would require recalculating every relationship in the model with each change made. Thus, electronic spreadsheet systems were invented to solve "what-if" problems, that is, changing an input and seeing what happens to an output. Another benefit of spreadsheet programs is also the capability of extracting statistical information out of a set of data that may for instance correspond to experimental measurements data in the field of pharmaceutical test, medical test, or even manufacturing test. As long as new measurements are available, the electronic spreadsheet as a capture and analysis tool can easily and automatically reflect the impact of the new measurements on some statistical summary information.

A common situation occurring in the electronic spreadsheet environment, is the management and handling of large tables where several samples are recorded in a plurality of fields, said samples corresponding for instance to biomedical test measurements. Each record comprises different samples—not necessarily all of them—measured at a given time. In addition a record can also contain other fields besides the sample fields, such as operational information fields. With such table, a common need is to evaluate some summary information (such as sums, means, maximums, minimums, standard deviations, etc.) in a given field, for the records fulfilling a criteria based on an order relationship.

This case is illustrated in the example shown in FIG. 3, based on a table 300 where each record 310 comprises 7 fields:

the name of the operator 301,
the temperature 302,
the "Measure#1" 303,
the "Measure#2" 304,
the "Measure#3" 305,
the "Measure#4" 306,
the "Measure#5" 307.

Depending on the records, all the measures or a subset of them are present. By convention, the records are introduced within the table 300 by adding the most recent record on the top. Therefore the bottom record 311 is the oldest one whereas the top record 312 is the most recent one.

After having filled the table 300, the spreadsheet user is looking for the following information:

Q 1: what is the average value of the 5 most recent samples of the "Measure#3" 305?

Q 2: what is the value of the most recent sample of the "Measure#1" 303?

Q 3: what is the value of the sample of the "Measure#5" 307 for the median sample of the "Measure#2" 304?

Q 4: What is the minimum value of the samples of the "Measure#4" 306 for the four least (less) recent samples of the "Measure#3" 305 with a value greater than 11.5 ?

The above 4 examples, combine, in a same question, a conventional criteria based on a field value, with a new type of criteria based on an order relationship. According to the present invention, it is also possible to combine, in a same question, several conventional criterias with several criterias based on an order relationship. This more complex combination of criterias is a quite valid and valuable requirement also addressed by the present invention. Such combination will not be further detailed in the description since it would only add complexity, at the expense of clarity.

These questions cannot be answered today with the conventional means available in electronic spreadsheet environments because the built-in statistical or database functions do not allow to take into account a criteria based on an order relationship such as:
- the 5 last samples of a field
- the last sample of a field
- the median sample of a field
- The 4 first samples of a field Indeed the conventional database functions available in electronic spreadsheet environments, allow the spreadsheet user to define criterias which are only based on the value taken by selected fields. Such database functions are quite powerful. They allow the spreadsheet user to automatically extract statistical information out of a potentially huge amount of data, while specifying through specific criterias the conditions to be fulfilled by the records contributing to the computation of the statistical information. Such database functions, as available in the Excel spreadsheet product from Microsoft Corporation, are for instance the following:

DAVERAGE (for computing field average for records matching a condition), DCOUNT (for counting records matching a condition), DMAX (for returning the highest field value for records matching a condition), DMIN (for returning the smallest field value for records matching a condition), DPRODUCT (for returning the multiplication of field values for records matching a condition), DSTDEV (for returning the field standard deviation for records matching a condition), DSUM (for returning the sum of field values for records matching a condition), DVAR (for returning the field variance for records matching a conditions).

Referring to FIG. 3, a @DAVG database function available in the 123 spreadsheet tool of Lotus Corporation, can for instance automatically provide the average temperature for the records where the operator is "frederic" according to the formula @DAVG(B2 . . . H25, "temperature", operator="frederic"). In this example, the criteria operator="frederic" relies on the value of the operator field 301. There is no conventional means available to specify a criteria based on an order relationship.

As a result, an electronic spreadsheet user, who needs to evaluate summary information, based on order oriented criteria, would have:
either to do part of the computation by himself (for instance the question Q1 can be answered by specifying the formula @AVG(F3, F6, F8 . . . F10) after having "manually" identified that the cells F3, F6 and F8 . . . F10 correspond to the last 5 samples for the "Measure#3" 305,
or do all the computation by himself (for instance the question Q2 can be answered by determining that the last sample of the "Measure#1" 303 has a value equal to 0.00707).

In both cases, the information is not fully automated, and is only valid for the current state of table 300. Indeed if a new record 312 is added at the top of table 300, with all the measurement fields populated, then the questions Q1 to Q4 will receive different answers.

The proposed invention offers an innovative solution to this problem by introducing an Order Oriented Criteria (OOC) for formally specifying a set of conditions based on order relationships, so that the computation of summary information such as the ones formulated in questions Q1 to Q4, gets fully automated.

PRIOR ART

Within the Lotus Corporation 123 (or Microsoft Excel) spreadsheet environments, an available function named @TRIMMEAN (or TRIMMEAN) provides some level of filtering based on an order relationship. Indeed this @TRIMMEAN function allows one to compute the mean value of a set of values belonging to a list which can be trimmed by a specified percentage. For instance the function call @TRIMMEAN (MyList, 10%) computes the average value of the set of values derived from the list named "MyList" by trimming out the top 5% values and the bottom 5% values. It must be noted here that the order relationship implicitly used is the comparison between the values taken by the cells within the list. In other words a cell C1 belonging to the list MyList is considered as being less than or equal to a cell C2 belonging to the list MyList if and only if the value of C1 is less than or equal to the value of C2. Such an order relationship can address some spreadsheet user needs, but is not generic enough to cover all situations.

SUMMARY OF THE INVENTION

The present invention is related to a method, system and computer program for use in a multidimensional electronic spreadsheet comprising a plurality of cells identified by a cell address along each dimension, for processing, on a data table, a command comprising one or a plurality of order oriented criterias. The said data table is defined as a structured multidimensional range of cells comprising:
  one or a plurality of fields, a field being defined as a range of cells along a first dimension;
  a plurality of records of same structure, ordered and aligned along said first dimension, a record being defined as a range of cells structured according to said one or a plurality of fields along a second dimension.

The method comprises the steps of:
  receiving a command comprising means for identifying a data table;
    a specified field in said data table;
    one or a plurality of cell content criterias, each cell content criteria specifying a condition related to a cell content and a field on which this cell content condition must be applied;
    one or a plurality of order oriented criterias, each order oriented criteria specifying a range of ranks according to a reference record complying with said one or plurality of cell content criterias in the data table, a range of rank comprising a rank or a continuous series of ranks, a rank being a positive or negative integer number;
  processing one or plurality of cell content criterias on the specified one or plurality of fields of the data base;

selecting the records complying with the processed one or plurality of cell content criterias;

determining, from a given first selected record in the data table, the rank of each selected record along the first dimension and entering said rank in a temporary field defined for each selected record, the rank of a selected record being defined as the number of selected records including said selected record, that comply with the cell content criterias, said selected records being counted along the first dimension from said first selected record up to said selected record;

converting the one or plurality of order oriented criterias in a new cell content criteria to apply on the temporary field, said step comprising, for each order oriented criteria, the further steps of:

identifying in the temporary field, the rank of the reference record;

recalculating the range of ranks specified in the order oriented criteria by adding the rank of the reference record, to the rank of the boundaries defining said range of ranks;

processing said new cell content criteria on the temporary field of the selected records;

identifying the records, among the selected records, complying said new cell content criteria;

returning the result of said received command, computed from the cells belonging to the field specified in the command, and the records identified among the selected records.

Further embodiments of the invention are provided in the appended dependent claims.

BRIEF DESCRIPTION OF THE DRAWINGS

The novel and inventive features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 3 shows a vertically structured table used in a scenario according to a preferred embodiment of the present invention.

FIG. 4 shows criteria ranges comprising Order Oriented Criterias used in a scenario according to a preferred embodiment of the present invention.

FIG. 5 shows a summary information table comprising database functions using criteria ranges comprising Order Oriented Criterias used in a scenario according to a preferred embodiment of the present invention.

DETAILED DESCRIPTION OF THE PREFERRED EMBODIMENT

System Hardware

Figure 1A:
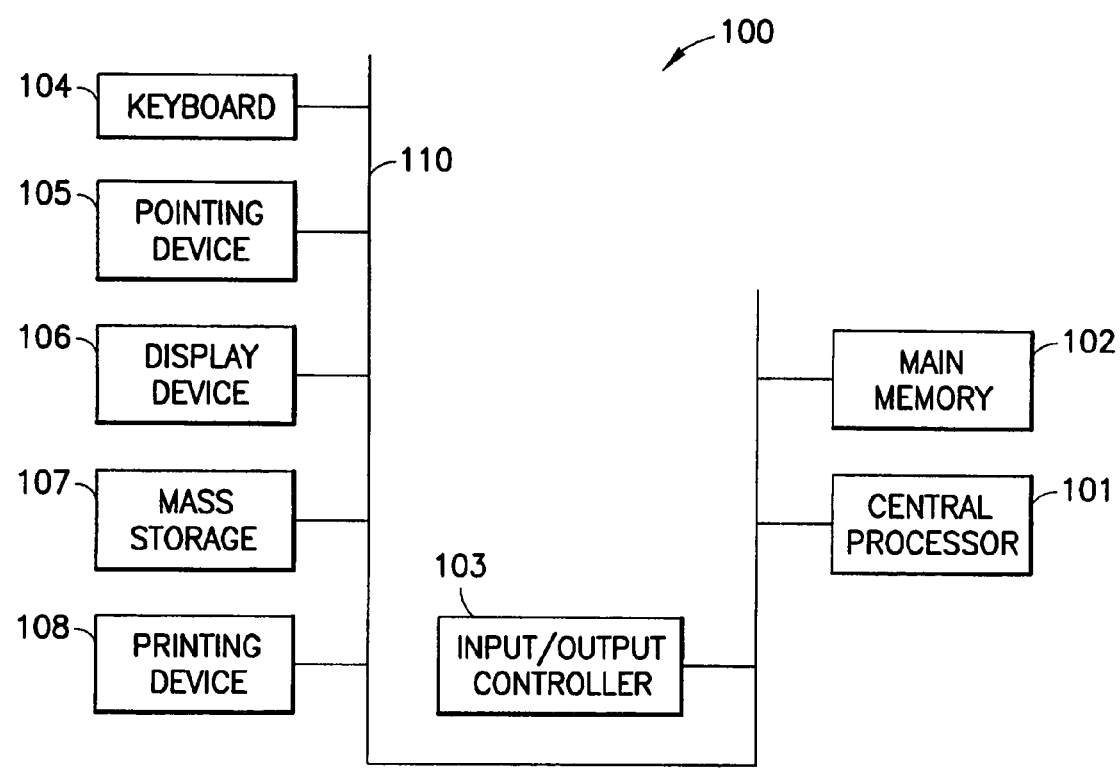
FIG. 1A shows a computer system in which the present invention may be embodied.

As shown in FIG. 1A, the present invention may be embodied on a computer system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in system 100 as desired. As illustrated, the various components of system 100 communicate through a system bus 110 or similar architecture. In a preferred embodiment, computer system 100 includes an IBM-compatible personal computer, which is available from several vendors (including International Business Machines Corporation of Armonk, N.Y.).

Figure 1B:
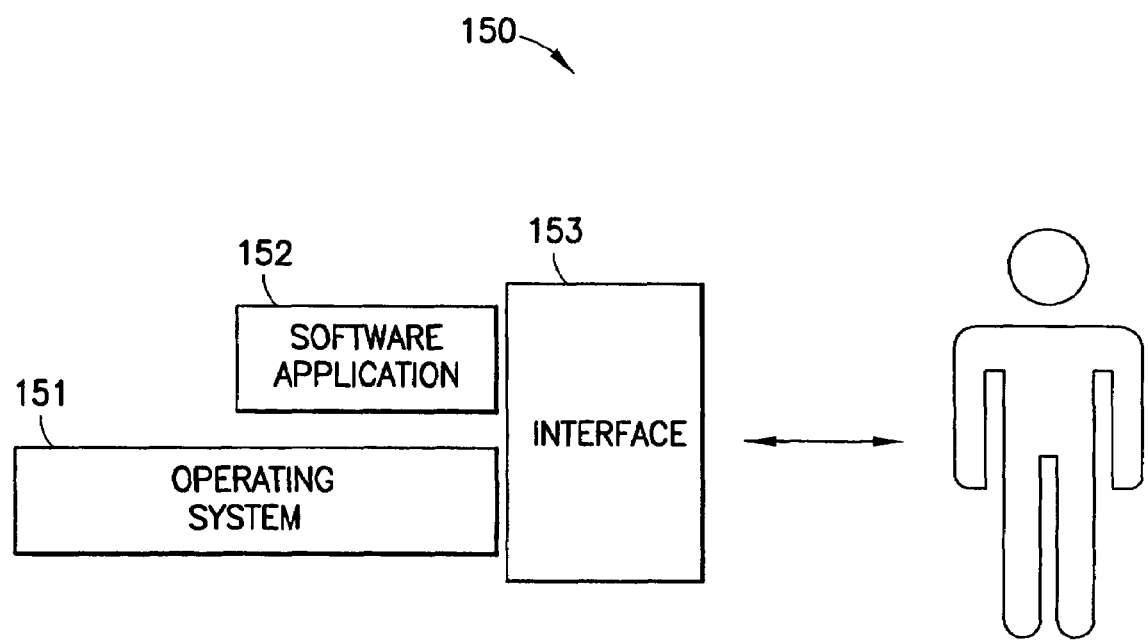
FIG. 1B shows a software system including an operating system, an application software, and a user interface for carrying out the present invention.

Illustrated in FIG. 1B, a computer software system 150 is provided for directing the operation of computer system 100. Software system 150, which is stored in system memory 102 and in mass storage 107, includes a kernel or operating system 151 and a shell or interface 153. One or more application programs, such as application software 152, may be "loaded" (i.e., transferred from mass storage 107 into memory 102) for execution by the system 100. The system 100 receives user commands and data through user interface 153; these inputs may then be acted upon by system 100 in accordance with instructions from operating module 151 and/or application module 152. The interface 153, which is preferably a graphical user interface (GUI), also serves to display results, whereupon the user may supply additional inputs or terminate the session. In a preferred embodiment, operating system 151 and interface 153 are Microsoft Win95, available from Microsoft Corporation of Redmond, Wash. Application module 152, on the other hand, includes a spreadsheet notebook of the present invention as described in further detail herein below.

Interface

A. Introduction

The following description will focus on the presently preferred embodiments of the present invention, which are embodied in spreadsheet applications operative in the Microsoft Win95 environment. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, NextStep, and the like. Therefore, the description of the exemplary embodiments which follows is for purposes of illustration and not limitation.

Figure 1C:
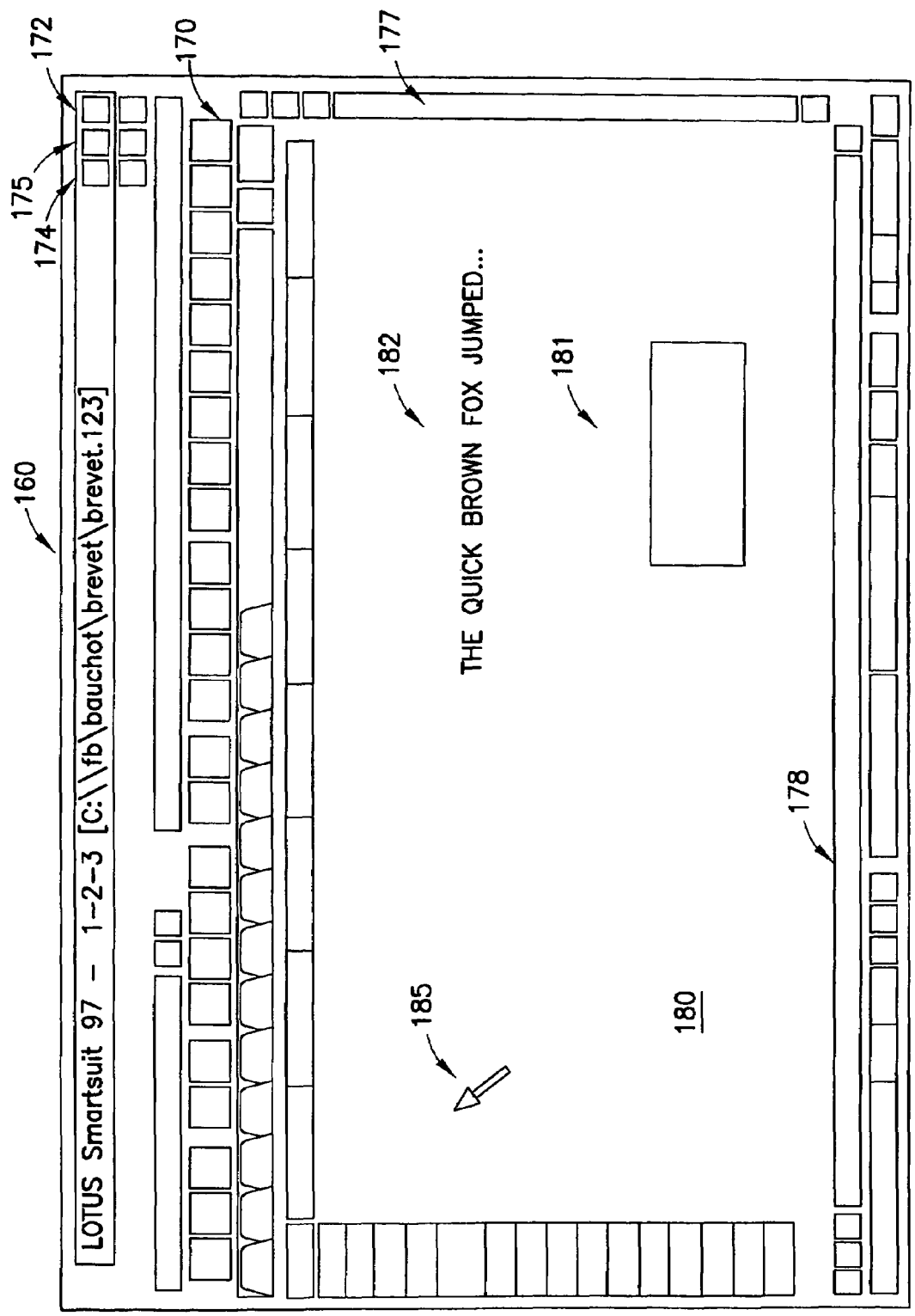
FIG. 1C illustrates the basic architecture and the functionality of a graphical user interface in which the present invention may be embodied.

Referring now to FIG. 1C, system 100 includes a windowing interface or workspace 160. Window 160 is a rectangular, graphical user interface (GUI) for display on display device 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within computer system 100.

Windowing interface 160 includes screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 160 may be closed, re-sized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., *Microsoft Mouse Programmer's Reference*, Microsoft Press, 1989. The general construction and operation of a GUI event-driven system, such as Windows, is also known in the art: see, e.g., Petzold, C., *Programming Windows*, Second Edition, Microsoft Press, 1990.

B. Preferred Interface

Figure 2A:
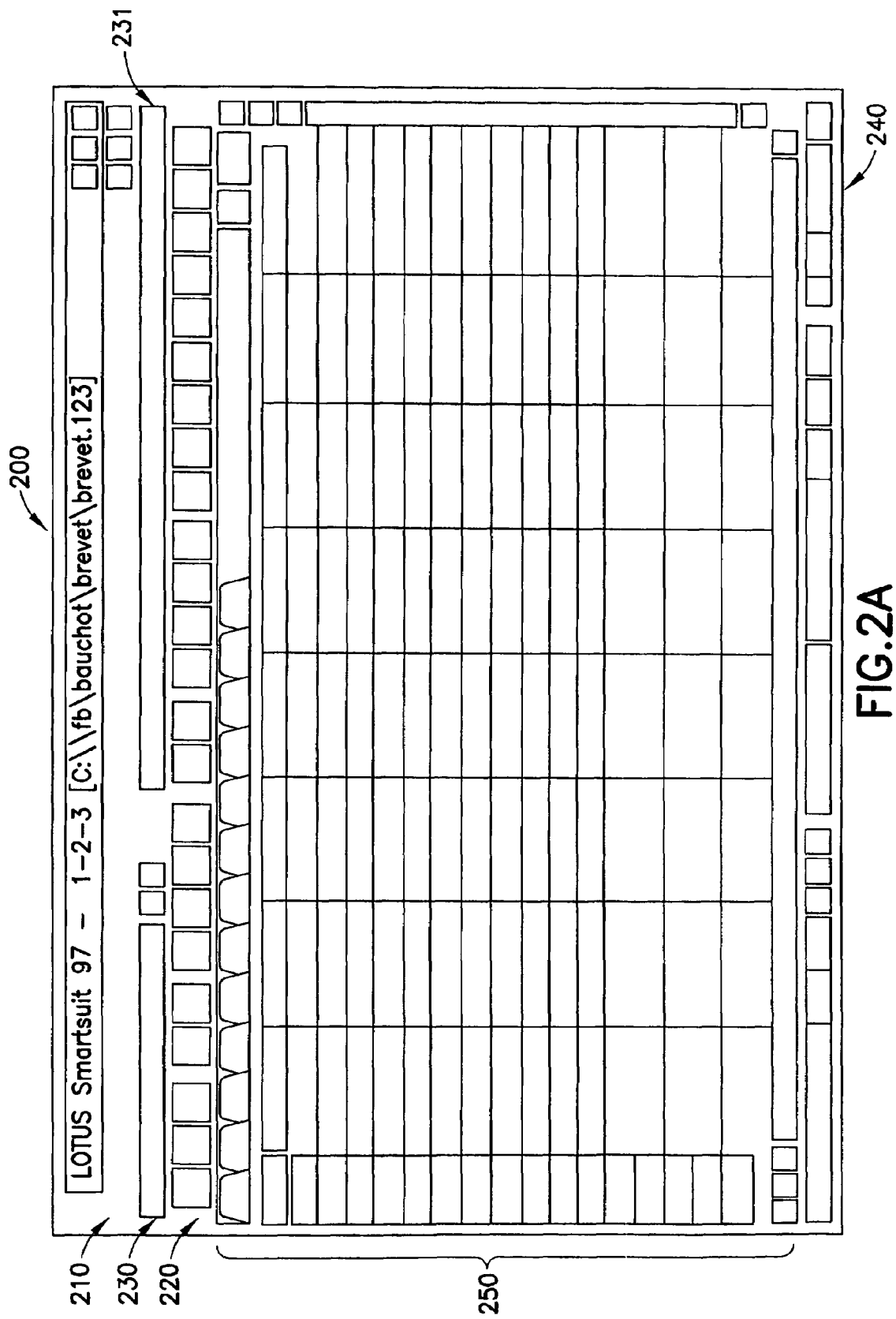
FIG. 2A shows a spreadsheet notebook interface according to a preferred embodiment of the present invention.

Shown in FIG. 2A, a spreadsheet notebook interface of the present invention will now be described. The spreadsheet notebook or workbook of the present invention includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window 250. The menu bar 210 displays and invokes, in response to user inputs, a main level of user commands. Menu 210 also invokes additional pull down menus, as is known in windowing applications. Input line 231 accepts user commands and information for the entry and editing of cell contents, which may include data, formulas, macros, and the like. Indicator 230 displays an address for the current cursor (i.e., active cell) position, or the address or name of a selected named range (i.e. active selection). At the status line 240, system 100 displays information about the current state of the workbook; for example, a "READY" indicator means that the system is ready for the user to select another task to be performed.

Figure 2B:
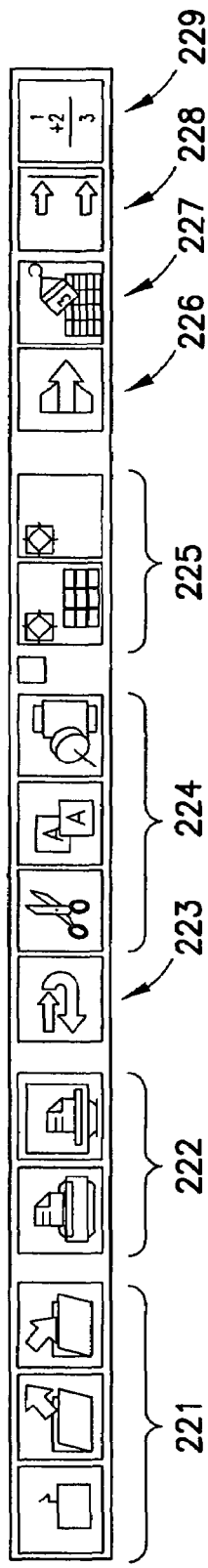
FIG. 2B shows the toolbar component of the notebook interface shown in FIG. 2A.

The toolbar 220, shown in further detail in FIG. 2B, comprises a row or palette of tools which provide a quick way for the user to choose commonly-used menu commands or properties. In an exemplary embodiment, toolbar 220 includes file manipulation buttons 221, printing buttons 222, an undo button 223, cut, copy, and paste buttons 224, information pop-up window buttons tool 225, a named range selection button 226, a style copy button 227, a column re-sizing button 228, and a sum button 229. The functions of these buttons are suggested by their names. For instance, buttons 224 cut, copy and paste data and objects to and from Windows' clipboard. The same actions are also available as corresponding commands in the Edit menu (available from menu bar 210).

The notebook, which provides an interface for entering and displaying information of interest, includes a plurality of spreadsheet pages. Each page may include conventional windowing features and operations, such as moving, re-sizing, and deleting. In a preferred embodiment, the notebook includes 256 spreadsheet pages, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a 2-D spread. Page A from notebook 200, for example, includes a grid in row and column format, such as row 3 and column F. At each row/column intersection, a box or cell (e.g., cell C4) is provided for entering, processing, and displaying information in a conventional manner. Each cell is addressable, with a selector being provided for indicating a currently active one (i.e., the cell that is currently selected).

Figure 2C:
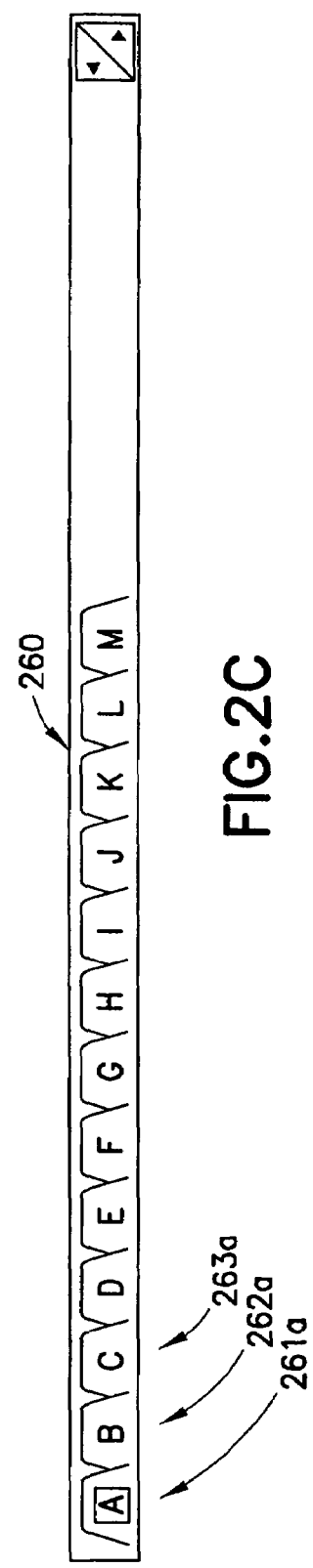
FIGS. 2C and 2D show page identifiers for rapidly accessing and manipulating individual pages of the notebook interface shown in FIG. 2A.
Figure 2D:
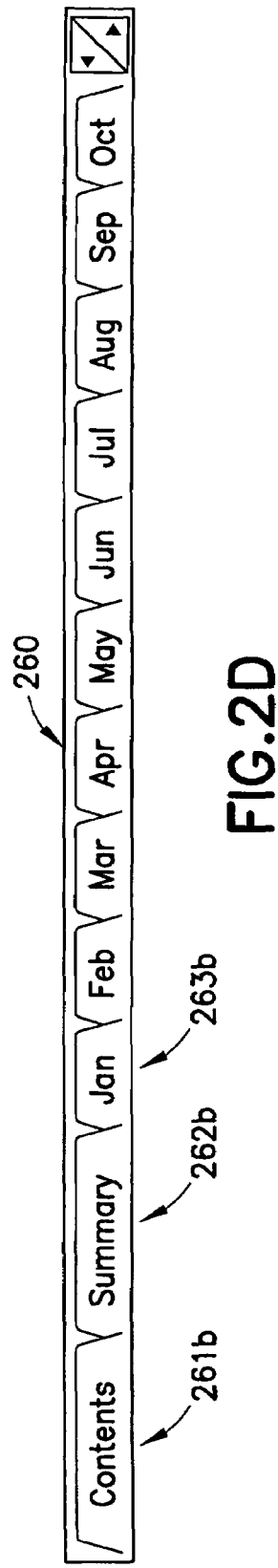

As shown in FIGS. 2C-D, individual notebook pages are identified by page identifiers 260, preferably located along one edge of a notebook. In a preferred embodiment, each page identifier is in the form of a tab member (e.g., members 261a, 262a, 263a) situated along a top edge of the notebook. Each tab member may include representative indicia, such as textual or graphic labels, including user selected titles representing the contents of a corresponding page. In FIG. 2C, the tab members 260 are set to their respective default names. For example, the first three tab members (members 261a, 262a, 263a) are respectively set to A, B, and C. Tab members are typically given descriptive names provided by the user, however. As shown in FIG. 2D, for example, the first three tab members have now been set to "Contents" (tab member 261b), "Summary" (tab member 262b), and "Jan" (tab member 263b). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition in the selection of an appropriate page of information, the user-customizable page identifiers serve to aid in the entry of spreadsheet named range addresses. For example, when entering a formula referring to a named range of cells on another page, the user may simply use the descriptive page name in the named range address, thus making it easier for the user to understand the relationship of the cell(s) or information being referenced.

A general description of the features and operation of the spreadsheet notebook interface may be found in Quattro Pro for Windows (*Getting Started, User's Guide and Building Spreadsheet Applications*), available from Borland International.

Management of Order Oriented Criteria

A. Introduction

The present invention offers a user-friendly solution to the problems described in the example illustrated in FIG. 3 where a spreadsheet user needs to get an automated answer to the four questions Q1 to Q4 related to table 300. More specifically, the present invention provides an innovative solution to the problems previously described thanks to the concept of Order Oriented Criteria. This concept of Order Oriented Criteria can be used according to the following steps:

Defining a virtual field named for instance "#RANK#" for the table on which the database function will be executed. In the present application, a table is defined as an ordered and structured multidimensional range of cells comprising:

one or a plurality of fields, a field being defined as a range of cells along a first dimension. In a preferred embodiment, a field is defined as a column.

a plurality of records of same structure, ordered and aligned along said first dimension, a record being defined as a range of cells structured according to said one or a plurality of fields along a second dimension. In a preferred embodiment, a record is defined as a row.

Defining reference default values associated with the field "#RANK#": TOP, MED, and BOTTOM. These reference default values respectively correspond to a first position, a median position, and a last position in a vertically arranged table where fields correspond to columns and records to rows.

Specifying an Order Oriented Criteria (OOC). An Order Oriented Criteria is defined as a couple comprising a first and a second element wherein:

the first element of the couple "#RANK#", is the name of the virtual field defined above, and the second element of the couple "EXPRESSION", specifies a range of ranks by means of:

absolute values (for instance "2" to designate the second record matching the non OOC criteria), or relative values with respect to the TOP, MED, or BOTTOM references (for instance "<TOP+5" to designate the first five records matching the non OOC criteria).

A range of ranks comprises a rank or a continuous series of ranks.

Complementing one or a plurality of conventional criterias (criterias based on the value of the cells) with one or a plurality of Order Oriented Criterias (OOC).

Defining a method to process the Order Oriented Criterias (OOC) specified as argument in a database function.

The preferred embodiment and scenario described hereafter, is based on the following operations:

first, the conventional criteria(s) is (are) resolved, and second, the Order Oriented Criteria(s) (OOC) is(are) resolved based on the results obtained after resolution of the conventional criteria(s).

This option is chosen because the need for an alternate option does not appear to be as valuable, and a manual solution consisting in selecting just a subset of the table is much simpler. However, an alternate embodiment, supporting another operations, can be described without departing from the spirit, and scope of the invention.

B. Scenario

In contrast to just-described conventional tools, the present invention provides a powerful, user-friendly and interactive approach for managing Order Oriented Criteria in database functions.

In a preferred embodiment, the present invention is used in three steps:

1. The first step occurs when the spreadsheet user decides, based on some needs not detailed here, to create and fill a vertically structured table where rows correspond to records and columns to fields, as illustrated by the table 300 shown in FIG. 3.

2. The second step occurs when the spreadsheet user decides, based on his or her own needs not detailed here, to define an Order Oriented Criteria within a criteria range, as illustrated in FIG. 4, in order to take advantage of the present invention.

The criteria range 401 with address B32 . . . C33 comprises:

first, a conventional criteria B32 . . . B33 stating that the eligible records must have a "Measure#3" field 305 with a strictly positive value, and second, an Order Oriented Criteria C32 . . . C33 stating that within the eligible records, only records with a rank strictly less than the rank of the top eligible record incremented by 5, are considered.

The criteria range 402 with address D32 . . . E33 comprises:

first, a conventional criteria D32 . . . D33 stating that the eligible records must have a "Measure#1" field 303 with a strictly positive value, and second, an Order Oriented Criteria E32 . . . E33 stating that within the eligible records, only the top eligible record is considered.

The criteria range 403 with address F32 . . . G33 comprises:

first, a conventional criteria F32 . . . F33 stating that the eligible records must have a "Measure#2" field 304 with a strictly positive value, and second, an Order Oriented Criteria G32 . . . G33 stating that within the eligible records, only the median eligible record is considered.

The criteria range 404 with address H32 . . . I33 comprises:

first, a conventional criteria H32 . . . H33 stating that the eligible records must have a "Measure#3" field 305 with a value strictly greater than 11.5, and second, an Order Oriented Criteria I32 . . . I33 stating that within the eligible records, only records with a rank strictly greater than the rank of the bottom eligible record decremented by 4, are considered.

In the former examples, a single Order Oriented Criteria specifying a condition was sufficient to address the spreadsheet user needs. The present invention does not limit, in fact, the number of Order Oriented Criterias (nor the number of conventional criterias). To illustrate this statement, a criteria range can comprise two Order Oriented Criterias with the top cells taking the value "#RANK#", with a first bottom cell taking the value ">TOP+5", and with a second bottom cell taking the value "<BOTTOM−4". These Order Oriented Criterias mean that the five top records and the four bottom records are discarded from the eligible records. The methods described in the following sections apply regardless of the number of specified Order Oriented Criterias.

3. The third step occurs when the spreadsheet user decides, based on his or her needs not detailed here, to take advantage of the present invention by calling one or several database functions with an Order Oriented Criteria defined in the criteria argument.

By using again the examples previously introduced, the questions Q1 to Q4 can be answered thanks to some formulas put in a table 500, as illustrated in FIG. 5.

1. Within the table 500, to answer question Q1, cell 501 with address G27 is filled with the following formula @DAVG(B2 . . . H25; "Measure#3"; B32 . . . C33).

Here, the criteria range is used to first filter out all the records with a non strictly positive value in the "Measure#3" field 305 and then, to consider only the top five remaining records. The resulting records are the records occupying in the table 300, the sheet rows 3, 6, 8, 9, and 10. The average value of the corresponding cells comprised in the "Measure#3" field 305 is equal to 10.70911.

2. Within the table 500, to answer question Q2, cell 502 with address G28 is filled with the following formula @DGET(B2 . . . H25;"Measure#1";D32 . . . E33). Here the criteria range indicates to first filter out all the records with a non strictly positive value in "Measure#1" field 303, and then to consider only the "TOP" remaining record. The resulting record is the one occupying the sheet row 6 in the table 300. The value of the corresponding cell comprised in the field "Measure#1" 303 is equal to 0.00707.

3. Within the table 500, to answer the question Q3, cell 503 with address G29 is filled with the following formula @DGET(B2 . . . H25; "Measure#5"; F32 . . . G33). Here the criteria range indicates to first filter out all the records with a non strictly positive value in "Measure#2" field 304, and then to consider only the record in the median position ("MED" record). The resulting record is the one occupying the sheet row 14 in the table 300. The value of the corresponding cell comprised in the field "Measure#5" 307 is equal to 74.66463.

4. Within the table 500, to answer question Q4, cell 504 with address G30 is filled with the following formula @DMIN(B2 . . . H25; "Measure#4"; H32 . . . I33). Here the criteria range indicates to first filter out all the records with a value in "Measure#3" field 305 not strictly greater than 11.5, and then to consider only the "BOTTOM" four remaining records. The resulting records are the ones occupying the sheet rows 15, 16, 17, and 23 in the table 300. The minimum value of the corresponding cells comprised in the field "Measure#3" 305 is equal to 10.70911.

As illustrated in the previous examples, by using an Order Oriented Criteria within the Criteria Range argument of database functions, the spreadsheet user can build synthetical information out of a set of parameters in a way which is much more powerful and user friendly than what is today available with conventional tools in electronic spreadsheet environments. Furthermore, considering again the previous example, if some new records must be added in the table 300, or existing records must be removed from the table 300, the presence of an Order Oriented Criteria in the Criteria Ranges 401, 402, 403 and 404 shown on FIG. 4 guarantees that the database functions, as called in the table 500, will return correct information when answering questions Q1 to Q4.

C. Order Oriented Criteria Handling Method

Figure 6A:
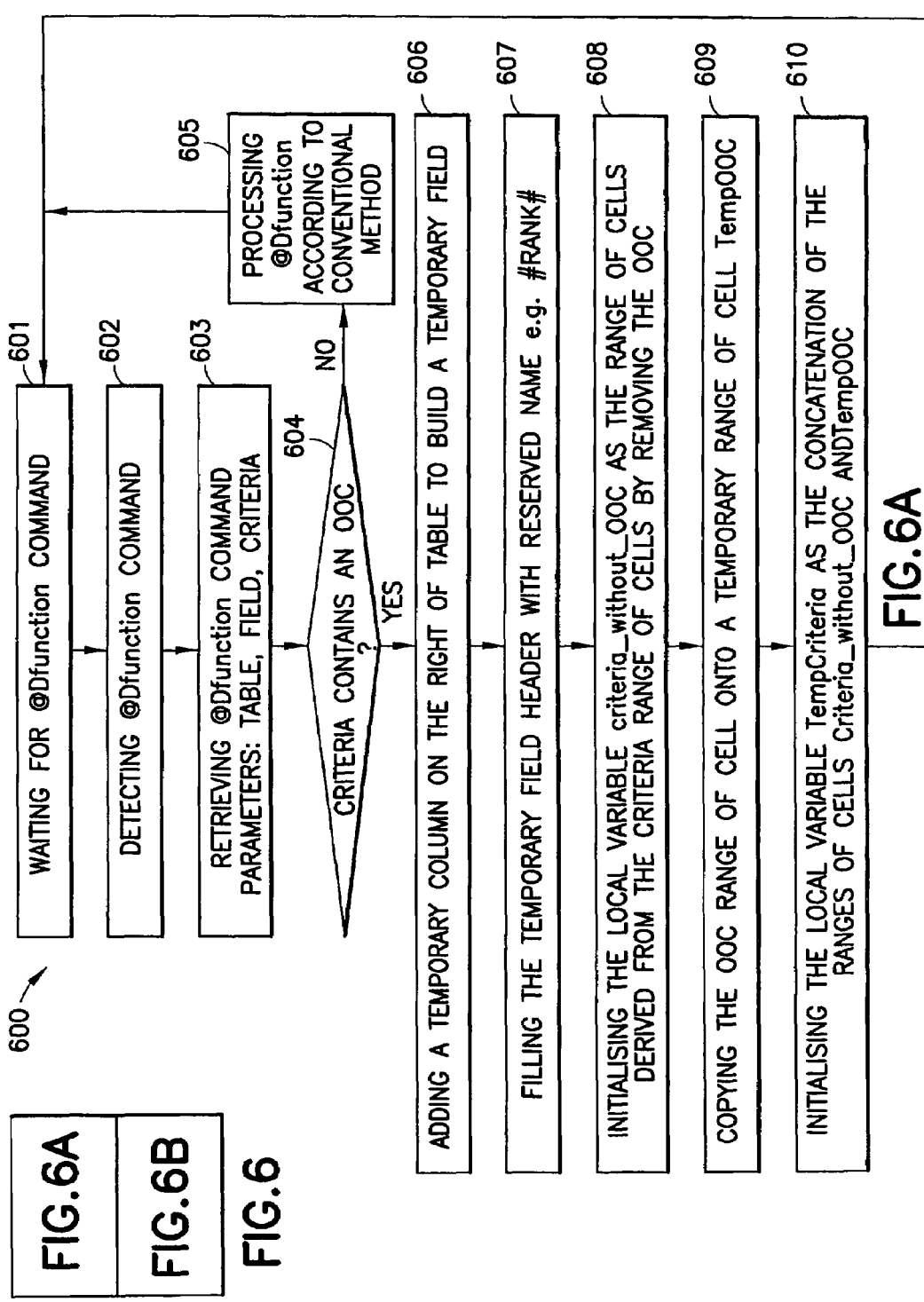
FIG. 6 is a flow chart illustrating a method for handling Order Oriented Criteria, according to the present invention.

The method for handling Order Oriented Criteria according to the present invention is summarised in flowchart 600 of FIG. 6. This method can be seen as the processing of a database function command. In the following steps, such a database function is referred to by the generic name @Dfunction. The method comprises the following steps:

At step 601, the method is in a default state, waiting for an event to initiate the process.

At step 602, an event is detected, as a result of the reception of a @Dfunction command.

At step 603, the parameters of the @Dfunction are retrieved and memorised into three local variables.

The first parameter TABLE identifies the database table within which the @Dfunction operates. In a preferred embodiment the parameter TABLE holds the name or the address of a range of cells corresponding to the database table.

The second parameter FIELD identifies a field belonging to the database table identified by the parameter TABLE. In a preferred embodiment, the parameter FIELD comprises the name of the field. This field is the one on which the @Dfunction command will be applied. The @Dfunction command will return a result derived from the content of the one or a plurality of cells belonging to this field and which are part of the one or a plurality of records complying with all the criterias specified in the third parameter of the @Dfunction.

The third parameter CRITERIA identifies the range of cells hosting the criterias used to identify the eligible records within the database table to compute the result of the @Dfunction. In a preferred embodiment, the parameter CRITERIA is the name or the address of the range of cells hosting the criterias.

At step 604, a test is performed to determine whether the range of cells identified by the parameter CRITERIA, comprises or not an Order Oriented Criteria (identified by a reserved word such as "#RANK#" in a top row cell). If it is the case, then control is given to step 606; otherwise control is given to step 605.

At step 605, the @Dfunction command is processed according to conventional means, as the passed parameters comply with conventional rules. Then control is returned back to the initial step 601 for processing any other future @Dfunction.

At step 606, a temporary column is inserted immediately on the right side of the range of cells identified by the parameter TABLE in order to build a new temporary field "#RANK#".

At step 607, the top cell of the new field introduced in the new column inserted at step 606 is initialised with a reserved name such as "#RANK#".

At step 608, a local variable CRITERIA_WITHOUT_OOC is initialised. The local variable CRITERIA_WITHOUT_OOC identifies a range of cells derived from the range of cells identified by the parameter CRITERIA but without the Order Oriented Criterias. This can be simply done by excluding from the range of cells identified by the parameter CRITERIA, the columns comprising in the top cell the reserved word "#RANK#".

At step 609, the Order Oriented Criterias present in the range of cells identified by the parameter CRITERIA, are copied onto a temporary range of cells named TEMPOOC. This can be simply done by selecting within the range of cells identified by the parameter CRITERIA, the columns comprising in the top cell the reserved word "#RANK#", and then by copy-pasting this selection onto the temporary range of cell named TEMPOOC.

At step 610, the local variable TEMPCRITERIA is used to identify the range of cells corresponding to the concatenation of the range of cells CRITERIA_WITHOUT_OOC with the range of cells TEMPOOC. In a preferred embodiment, the local variable TEMPCRITERIA comprises the name of the concatenated range of cells.

At step 611, the local variable EXTENDED_TABLE is used to identify the range of cells corresponding to the concatenation of the range of cells identified by the parameter TABLE with the range of cells corresponding to the new temporary "#RANK#" field introduced at step 606. In a preferred embodiment the local variable EXTENDED_TABLE comprises the name of the concatenated range of cells.

At step 612, the local variable CURR_CELL is initialised to identify the top first cell within the new temporary "#RANK#" field.

At step 613, the local variable SUBTABLE is initialised to identify the range of cells whose top left cell is the top left cell of the range of cells identified by the parameter TABLE, and whose bottom right cell is the cell located immediately at the left of CURR_CELL. In a preferred embodiment the local variable SUBTABLE comprises the name of the range of cells whose top left cell is the top left cell of the range of cells identified by the parameter TABLE, and whose bottom right cell is the cell located immediately at the left of CURR_CELL.

At step 614, the content of the cell CURR_CELL is initialised with the following formula: @DCOUNT(SUBTABLE, FIELD, CRITERIA_WITHOUT_OOC).

This formula is expressed using the syntax defined by the 123 spreadsheet product of Lotus Corporation (from which similar formulas for other environments such as the Excel spreadsheet product from Microsoft Corporation can be easily derived). The object of this step is to materialize an order relationship between the records complying with the conventional cell content criteria (s): the records complying with the conventional cell content criteria(s) are counted from the top of the table to the CURR_CELL cell position.

At step 615, a test is performed to determine whether or not the cell CURR_CELL is the last bottom cell of the range of cells corresponding to the new temporary "#RANK#" field.

If it is the case, then control is given to step 617; otherwise control is given to step 616.

At step 616, the cell located below the cell CURR_CELL becomes the new cell CURR_CELL. Then control is given to step 613.

At step 617, the bottom cells (starting on the second row) of the TEMPOOC range of cells are updated:

first, by replacing the reserved keywords TOP, BOTTOM and MED by respectively:

the value 1 (one),
the value of the cell CURR_CELL, and
the value taken by the formula E(BOTTOM/2)+1 (where E(x) represents the largest integer number smaller than or equal to x), second, by evaluating the term previously comprising one of these three reserved keywords.

To further illustrate this step, let us consider the example of the cell with address C33, as shown on FIG. 4, with a content equal to "<TOP+5". This cell has been first copied onto TEMPOOC (step 609), so that the same content is present within TEMPOOC on the second row.

First, by replacing the reserved keyword TOP by the value 1, the content becomes "<1+5".

Second, by evaluating the resulting term, the content becomes "<6".

Doing this, the TEMPOOC temporary range of cells becomes a conventional criteria range, so that in turn the TEMPCRITERIA range of cells becomes also a conventional criteria range.

At step 618, the method returns to the @Dfunction caller, the value taken by the following formula (still using the syntax defined within the spreadsheet program 123 from Lotus Corporation): @Dfunction (EXTENDED_TABLE, FIELD, TEMPCRITERIA). As the range of cells identified by the local variable EXTENDED_TABLE comprises a conventional field named "#RANK#", and as the criteria range TEMPCRITERIA does not comprise Order Oriented Criterias, but instead a conventional criteria pointing to the field named #RANK#, the processing of this formula is done by using conventional means. Furthermore, thanks to the construction of the ranges of cells EXTENDED_TABLE, and TEMPCRITERIA, the value taken by this formula takes appropriately into account the Order Oriented Criterias present as part of the arguments identified at step 603.

At step 619, the temporary column introduced at step 606 is deleted to restore the original spreadsheet arrangement, and the TEMPOOC temporary range of cells is released from memory. Then control is returned back to the initial step 601 for processing any other future @Dfunction.

Alternate Embodiments

While the invention has been particularly shown and described with reference to a preferred embodiment, it will be understood that various changes in form and detail may be made therein without departing from the spirit, and scope of the invention.

The Order Oriented Criteria handling method and system according to the present invention may be used advantageously in those environments where elements of information are organised in horizontally structured tables.

What is claimed is:

1. A method, being executable by a computer, for use in a multidimensional electronic spreadsheet comprising a plurality of cells identified by a cell address along each dimension, for processing, on a data table, a command comprising one or a plurality of order oriented criteria, said data table being defined as a structured multidimensional range of cells comprising: one or a plurality of fields, a field being defined as a range of cells along a first dimension; a plurality of records of same structure, ordered and aligned along said first dimension, a record being defined as a range of cells structured according to said one or a plurality of fields along a second dimension; said method comprising the steps of:

receiving a command comprising means for identifying:
a data table;
a specified field in said data table;
one or a plurality of cell content criteria, each cell content criterion specifying a cell content condition related to a cell content and a field on which said cell content condition must be applied;
one or a plurality of order oriented criteria, each order oriented criterion specifying a range of ranks according to a reference record complying with said one or plurality of cell content criteria in the data table, a range of rank comprising a rank or a continuous series of ranks, a rank being a positive or negative integer number;

processing one or plurality of cell content criteria on the specified one or plurality of fields of the data table;

selecting the records in the data table complying with the processed one or plurality of cell content criteria;

determining, from a given first selected record in the data table, the rank of each selected record along the first dimension and entering said rank in a temporary field defined for each selected record, the rank of a selected record being defined as the number of selected records including said selected record, that comply with the cell content criterias said selected records being counted along the first dimension from said first selected record up to said selected record;

converting the one or plurality of order oriented criteria in a new cell content criterion to apply on the temporary field, said step comprising, for each order oriented criterion, the further steps of:

identifying in the temporary field, the rank of the reference record;

recalculating the range of ranks specified in the order oriented criterion by adding the rank of the reference record, to the rank of the boundaries defining said range of ranks;

processing said new cell content criterion on the temporary field of the selected records;

identifying the records, among the selected records, complying said new cell content criterion;

returning a result of said received command, computed from the cells belonging to the field specified in the command, and the records identified among the selected records.

2. The method according to claim 1, wherein the received command comprises a further means for identifying the temporary field, said means comprising a name.

3. The method according to claim 1, wherein the reference record is defined as being the first selected record, said first selected record having a rank equal to one.

4. The method according to claim 1, wherein the reference record is defined as being the last selected record, said last selected record having a rank equal to the total number of selected records.

5. The method according to claim 1, wherein the reference record is defined as being the median selected record, said median selected record having a rank equal to N+1 such that N is the largest integer number smaller than or equal to the total number of selected records divided by two.

6. The method according to claim 3, wherein the first selected record is the selected record in the data table with the lowest address along the first dimension.

7. The method according to claim 4, wherein the last selected record is defined as the selected record with the highest address along the first dimension.

8. The method according to claim 7, wherein the step of determining, from a first record in the data table, the rank of each selected record along the first dimension, comprises the further step of counting said selected records from the selected record with the lowest address up to said selected record.

9. The method according to claim 1, wherein the step of returning the result of said received command, computed from the cells belonging to the field specified in the command, and the records identified among the selected records, comprises the further step of deleting the temporary field.

10. A system comprising means adapted for carrying out the method according to claim 1.

11. A computer program, being executable by a computer, comprising instructions for carrying out the method according to claim 1.

* * * * *